US 6,747,434 B2

(12) United States Patent
Pigott et al.

(10) Patent No.: US 6,747,434 B2
(45) Date of Patent: Jun. 8, 2004

(54) METHODS AND DEVICES FOR CONTROLLING STEPPER MOTORS

(75) Inventors: John M. Pigott, Phoenix, AZ (US); Peter J. Pinewski, Howell, MI (US); T. Jeffrey Reiter, Dearborn, MI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/155,811

(22) Filed: May 25, 2002

(65) Prior Publication Data
US 2003/0218442 A1 Nov. 27, 2003

(51) Int. Cl.⁷ .................................................. H02P 8/00
(52) U.S. Cl. ....................................... 318/696; 318/685
(58) Field of Search ............................... 318/696, 685, 318/561, 601, 560

(56) References Cited

U.S. PATENT DOCUMENTS

| | | | | |
|---|---|---|---|---|
| 4,156,170 A | * | 5/1979 | Strunc | 318/696 |
| 4,333,045 A | | 6/1982 | Oltendorf | 318/696 |
| 4,568,866 A | * | 2/1986 | Floro et al. | 318/696 |
| 4,589,790 A | * | 5/1986 | Corbin et al. | 400/322 |
| 4,847,544 A | | 7/1989 | Goldberg | 318/696 |
| 4,851,755 A | * | 7/1989 | Fincher | 318/696 |
| 4,866,357 A | * | 9/1989 | Miller et al. | 318/443 |
| 4,977,428 A | * | 12/1990 | Sakakura et al. | 399/75 |
| 5,006,773 A | | 4/1991 | Goldberg | 318/696 |
| 5,115,415 A | | 5/1992 | Mumby et al. | 367/85 |
| 5,218,935 A | | 6/1993 | Quinn, Jr. et al. | 123/90.17 |
| 5,274,316 A | | 12/1993 | Evans et al. | 318/696 |
| 5,448,117 A | | 9/1995 | Elliott | 310/49 |
| 5,574,351 A | | 11/1996 | Jacobson et al. | 318/696 |
| 5,936,371 A | | 8/1999 | Bolash et al. | 318/685 |
| 5,938,529 A | | 8/1999 | Rodesch et al. | 436/20 |
| 6,064,171 A | | 5/2000 | Barkley et al. | 318/696 |
| 6,208,107 B1 | | 3/2001 | Maske et al. | 318/685 |

OTHER PUBLICATIONS

Jones, "Control of Stepping Motors, a tutorial," 88 pages printed from http://www.cs.uiowa.edu/~jones/step/ on May 2, 2002.
T. Jeffrey Reiter, "MC33991 Preliminary Data Sheet," 27 pages, May 25, 2001.
"Stepper Motor Systems Basics," 9 pages printed from the AMS Advanced Micro Systems, Inc. website, http://ams2000/stepping101.html, on Aug. 7, 2000.

* cited by examiner

Primary Examiner—Rina Duda
Assistant Examiner—Renata McCloud
(74) Attorney, Agent, or Firm—Fulbright & Jaworski L.L.P.

(57) ABSTRACT

In one embodiment, the invention involves a method for controlling a stepper motor. The method includes creating an information set that defines a first acceleration profile of a stepper motor and a first deceleration profile of the stepper motor; and directing the stepper motor to follow either a second acceleration profile or a second deceleration profile after the stepper motor begins to follow either the first acceleration profile or the first deceleration profile. In another embodiment, the invention is a stepper motor controller that includes a circuit configured to store an information set that defines a first acceleration profile of a stepper motor and a first deceleration profile of the stepper motor; and direct the stepper motor to follow either a second acceleration profile or a second deceleration profile after the stepper motor begins to follow either the first acceleration profile or the first deceleration profile.

26 Claims, 4 Drawing Sheets

METHODS AND DEVICES FOR CONTROLLING STEPPER MOTORS

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The invention relates generally to the field of stepper motors. More particularly, the invention relates to the control of stepper motors.

2. Related Art

Many of today's automotive instrument clusters use air core motors to drive the various gauges in the cluster. A cluster can include different gauges for measuring speed, engine rpms, fuel level, battery power, oil pressure, and the like. Air core motors can control the pointers on gauges precisely and smoothly. However, air core motors are relatively expensive. Stepper motors, which are sometimes referred to as "step" or "stepping" motors, are typically less expensive than comparably powerful air core motors and can also be used to control such gauges.

Stepper motors are equipped with coils, or windings. Current is applied to the individual coils in order to advance the stepper motor a desired number of steps. Depending on how the current is applied (versus the duration with which it is applied), the stepper motor can be caused to move in full steps, half steps, or even micro-steps.

A stepper motor is characterized by operational features such as its maximum velocity (measured, e.g., in steps per unit time), its maximum acceleration (measured, e.g., in steps per unit time squared), and its step value, which represents a ratio of steps to degrees, or distance, of movement (e.g., a rotational step value of 12 steps/degree means that it takes the stepper motor 12 steps to achieve one degree of rotation). From these operational features, it is possible to build a table that details how long it takes to move each step. In the art, this table is sometimes referred to as a "ramp" table. The values in the table, which can include the time duration required between steps, define how the stepper motor can be operated.

Known stepper motors have been operated using a single table. In such cases, the acceleration profile and the deceleration profile that characterize the movement of the stepper motor are the same. That is, they share the same absolute value for slope (the acceleration slope is positive and the deceleration slope is negative). In these cases, problems of jitter and overshooting have existed.

For example, during operation, a controller with access to a single table for both acceleration and deceleration of the stepper motor will recognize the point, or speed, to which it must decelerate. It will then cause the stepper motor to decelerate along the predetermined deceleration profile. During that deceleration, if the controller receives another signal indicating a final deceleration point that is closer to the current position of the stepper motor than the original deceleration point, the controller causes the motor to continue following the deceleration profile (i.e., the only profile available), the new final point is overshot by the motor, and the controller then commands the motor to back step until it reaches the new final point. This jitter can take the form of a bounce in the movement of the pointer on the gauge that the stepper motor is controlling. In addition to jitter, another problem caused by the access to only a single table is sluggishness. In other words, if a prior art controller commands a stepper motor to follow the deceleration profile to reach a first destination, and the controller then receives a signal indicating that the stepper motor should reach a second, closer destination, the prior art controller cannot adjust to the changed destination, and the motor sluggishly moves to its first destination point and then back steps (i.e., reverses direction—such as going from clockwise to counter clockwise) to the second destination point.

Known stepper motors have also been operated using multiple tables, each such table having defined an acceleration or deceleration profile, and sometimes both, of the particular stepper motor. Thus, it has been known to use at least two tables to accelerate a stepper motor along an acceleration profile and then decelerate the stepper motor along a deceleration profile that is not symmetrical with the acceleration profile. However, those profiles were static, and could not be changed during acceleration or deceleration. That is, the values in prior tables have not been adjusted during acceleration or deceleration to alter the profile or profiles they defined. Further, once acceleration or deceleration had begun, it was not possible to switch between profiles to adjust to a change in the requested position of the stepper motor. The use of multiple tables to operate a stepper motor may be time consuming in terms of computational overhead and in terms of the amount of memory needed to store the tables. The problems of jitter and sluggishness also exist because of the inability to switch between profiles, or adjust a profile, during acceleration or deceleration.

In sum, while less expensive, stepper motors are more complex to control and may produce movement that is inherently more jittery than the movement produced by air core motors. While stepper motors have been operated according to multiple tables, that operation is predetermined and static, because prior controllers and control methods have controlled stepper motors according only to the values in the tables. No deviation from the acceleration or deceleration profile defined by the table has been possible during acceleration or deceleration, and it has not been possible to switch profiles in response to a requested change in position once acceleration or deceleration began. These shortcomings are at least some of the reasons that the cheaper stepper motors have not overtaken air core motors for use in controlling gauges in automotive instrument clusters.

SUMMARY OF THE INVENTION

Provided are methods and devices for controlling stepper motors. In one embodiment of the invention, a method for controlling a stepper motor is provided. The method includes creating an information set that defines a first acceleration profile of a stepper motor and a first deceleration profile of the stepper motor; and directing the stepper motor to follow either a second acceleration profile or a second deceleration profile after the stepper motor begins to follow either the first acceleration profile or the first deceleration profile.

In another embodiment, the invention is a stepper motor controller that includes a circuit configured to store an information set that defines a first acceleration profile of a stepper motor and a first deceleration profile of the stepper motor; and direct the stepper motor to follow either a second acceleration profile or a second deceleration profile after the stepper motor begins to follow either the first acceleration profile or the first deceleration profile.

Advantages associated with these embodiments of the invention include the flexibility to follow different acceleration and deceleration profiles after acceleration or deceleration has started, in contrast to prior art methods and controllers. As a result, greater accuracy and smoother movement may be achieved with these embodiments of the invention than with prior art methods.

The terms "a" and "an" mean one or more than one. The term "plurality" means two or more than two. The term "another" means at least a second or more. The term "connected" encompasses both direct and indirect connections, and is not limited to mechanical connections. The term "substantially" and "substantially similar" means at least approaching a given state (e.g., preferably within 10% of, more preferably within 1% of, and most preferably within 0.5% of). In the context of acceleration/deceleration profiles, two profiles are therefore "substantially similar" if entries of one profile tracks corresponding entries of the other profile within 10%, more preferably within 1%, and most preferably within 0.5%.

These and other embodiments of the present methods and devices will be better understood when considered in conjunction with the following description and the drawings. It should be understood, however, that the following description, while indicating various embodiments of the present methods and devices and numerous specific details of them, is given by way of illustration and not limitation. Many substitutions, modifications, additions and/or rearrangements may be made to the embodiments discussed below without departing from the scope of the present methods and devices, and the present methods and devices include all such substitutions, modifications, additions and/ or rearrangements.

BRIEF DESCRIPTION OF THE DRAWINGS

The drawings are included to depict certain aspects of the present methods and devices. In the drawings, like reference numerals (if they occur in more than one view) designate the same elements. It should be noted that the features illustrated in the drawings are not necessarily drawn to scale.

DESCRIPTION OF THE ILLUSTRATIVE EMBODIMENTS

Figure 1:
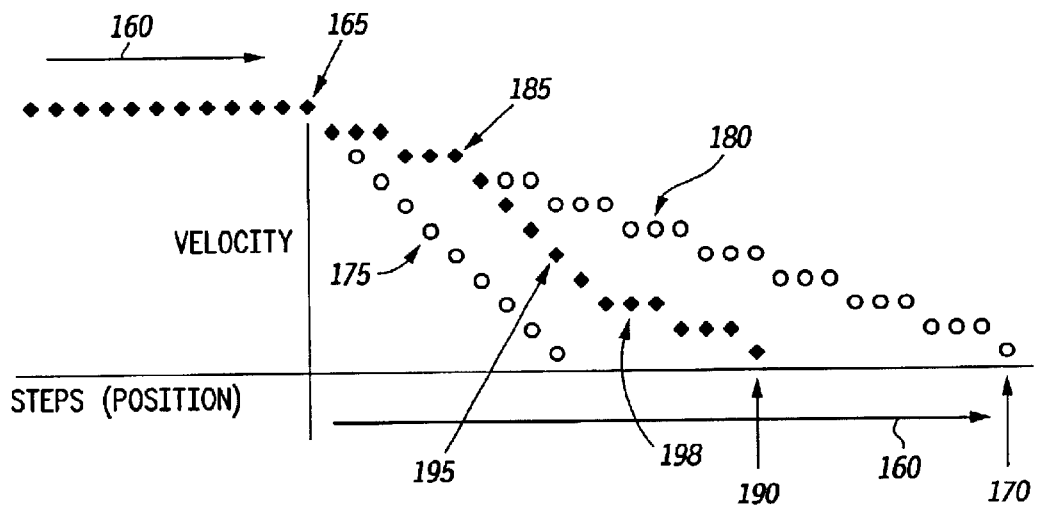
FIG. 1 is a graph illustrating the flexibility of an embodiment of the present invention that allows for a motor to be decelerated along different profiles during deceleration.

The present methods and devices and the various features and advantageous details associated with them are explained more fully with reference to the nonlimiting embodiments that are illustrated in the drawings and described in the following description. Descriptions of certain well known components and processing techniques are omitted so as not to obscure the present methods and devices in unnecessary detail.

Embodiments of the present methods and devices address shortcomings in the state of the art of stepper motor controllers and control methods, such as those mentioned above, by providing techniques that reduce jitter, and allow for differing acceleration and deceleration profiles using a single table or information set. Moreover, using the present methods and devices, it is possible to adjust the acceleration or deceleration profile of a stepper motor as acceleration or deceleration is occurring. Furthermore, the ability to direct a stepper motor to adjust its profile in response to a changing input (e.g., in the form of a new desired deceleration or acceleration point) is possible using the information in a single table or information set. Until now, multiple tables were required to direct a stepper motor to move according to multiple acceleration or deceleration profiles, and adjustments to the acceleration or deceleration profile once acceleration or deceleration had started were not possible.

Applications for the present methods and devices are vast and include any application that involves controlling a stepper motor's movement. Such applications include controlling stepper motors that control automotive gauges (e.g., the gauges in automotive instrument clusters), air conditioning equipment, printers, watches and clocks, aspects of pinball machines, facsimile machines, copiers, computer numerical control machines (e.g., a milling machine), and the like. Other suitable applications will become apparent to those of skill in the art having the benefit of this disclosure.

Stepper motors are stepped by sending signals (e.g., current) to the individual coils of the motor. The direction the motor is turning (i.e., clockwise versus counter clockwise) can be changed by adjusting the current sent to each coil of the motor.

Stepper motors are characterized by various operational features, such as the motor's maximum velocity, maximum acceleration, and a step value. The time that elapses between steps defines the motor velocity, and the changing time defines the motor acceleration. A stepper motor's step value is a measure of the number of steps required to cause a certain degree of rotation of the rotor. For example, a rotational value of 12 steps/degree means that it takes the stepper motor 12 steps to achieve one degree of rotation of the rotor. The present methods and devices apply to stepper motors that effect linear movement. The step value for such a motor may be described in terms of steps per degree, which may then be translated to steps per unit of linear movement by multiplying the steps/degree value by the number of degrees required to effect a unit of linear movement. Such linear stepper motors may operate on the principle of rotation that is translated to linear movement through, for example, a worm gear. In addition, linear stepper motors may be truly linear motors, the movement of which needs no translation from rotational movement. Both types of linear stepper motors may be controlled according to the present methods.

With one or more of these operational features, such as all three mentioned above, it is possible to generate information that represents the duration between signals that are sent to the stepper motor to cause it to move. More specifically, with one or more of these operational features, one can generate an information set, such as a table, that has at least one time value, or interval, corresponding to, or associated with, a given step of the stepper motor. That is, the information set generated may have at least one time value (represented in seconds or microseconds or any suitable representation of time) that establishes the time it takes to achieve a particular step of the stepper motor. The information set may, in another embodiment, include a time value corresponding to each step of the stepper motor. In still another embodiment, the information set may include time values associated with some, but not all, of the steps of the stepper motor.

One embodiment of generating an information set, such as a table, is achieved using the following equations. The units of position are steps, and velocity and acceleration are in steps/second, and steps/second$^2$. From an initial position of 0, with an initial velocity u, the stepper motor position s at a time t is:

$$s = ut + \tfrac{1}{2}at^2 \quad (1)$$

where a is the actual acceleration of the stepper motor.

The time value t, which represents the time duration between single steps, is given by:

$$t = \frac{-u + \sqrt{u^2 + 2a}}{a} \quad (2)$$

In this embodiment, equation 2 defines the time increment between steps (of value "1") when the stepper motor is initially travelling at a velocity u. In an embodiment where the generation is carried out using, for example, an application specific integrated circuit and the s and t values are being stored in ROM, the values for t may be quantized to multiples of the system clock by rounding upwards (to ensure that the acceleration of the stepper motor never exceeds the allowed value). However, the actual velocity v and acceleration a may be calculated from the time step that is actually used.

Using $$v^2 = u^2 + 2as \quad (3)$$

and $$v = u + at \quad (4)$$

and solving for v in terms of u and t, with s having a value of "1," gives $$v = 2/t - u \quad (5)$$

The correct value of t to use in equation 5 is the quantized value that may be obtained above.

In one embodiment, a set of recursive equations may be generated from equations 1–5 to give the allowed time step between signals sent to the motor when the motor is accelerating from a stop to its maximum velocity.

For example, starting from a position p of 0, and a velocity v of 0, the following equations define the time interval between steps at each position. To drive the motor at maximum performance, signals sent to move the motor (e.g., index commands) are given to the motor at these time intervals. An information set—e.g., a table—may be generated giving the time step $\Delta t$ at an index position n.

Thus, where $p_0 = 0$ and $v_0 = 0$, $$\Delta t_n = \left\lceil \frac{-v_{n-1} + \sqrt{v_{n-1}^2 + 2a}}{a} \right\rceil \quad (6)$$

where $\lceil \; \rceil$ indicates rounding up, $$v_n = \frac{2}{\Delta t_n} - v_{n-1} \quad (7)$$

and $$p_n = n \quad (8)$$

Note from equation 8 that $p_n = n$ in the information set in this embodiment. Thus, the information set includes the information that on the nth step, the rotor of the motor has moved (or been indexed) n positions, and has been accelerating steadily at the maximum allowed rate. This same information set also indicates the minimum distance the motor must travel while decelerating to a stop. Specifically, the 'stopping distance' is also equal to the current value of n. An example of an information set in the form of a table appears in Table 1 for a stepper motor with a maximum velocity of 4800 microsteps/s, a maximum acceleration of 54000 microsteps/s$^2$, and a rotational step value of 12 microsteps/degree of pointer movement, meaning that 12 microsteps of the stepper motor, which actually translate to 180 degrees of stepper motor rotor movement, result in one degree of movement by the pointer the stepper motor is controlling. The values for t in the information set are quantized to a 1 MHz clock.

TABLE 1

| Position ($\mu$steps) | Time Between Steps ($\mu$s) | Velocity ($\mu$steps/s) |
| --- | --- | --- |
| 0 | 0 | 0.00 |
| 1 | 6086 | 350.58 |
| 2 | 2521 | 480.52 |
| 3 | 1935 | 582.15 |
| 4 | 1631 | 668.51 |
| 5 | 1437 | 744.92 |
| 6 | 1299 | 814.19 |
| 7 | 1195 | 878.01 |
| 8 | 1112 | 937.50 |
| 9 | 1045 | 993.43 |
| 10 | 988 | 1046.38 |
| 11 | 940 | 1096.77 |
| 12 | 898 | 1144.95 |
| 13 | 861 | 1191.18 |
| 14 | 829 | 1235.68 |
| 15 | 800 | 1278.63 |
| 16 | 773 | 1320.19 |
| 17 | 750 | 1360.48 |
| 18 | 728 | 1399.61 |
| 19 | 708 | 1437.67 |
| 20 | 690 | 1474.76 |
| 21 | 673 | 1510.93 |
| 22 | 657 | 1546.25 |
| 23 | 642 | 1580.79 |
| 24 | 628 | 1614.59 |
| 25 | 615 | 1647.70 |
| 26 | 603 | 1680.15 |
| 27 | 592 | 1711.99 |
| 28 | 581 | 1743.24 |
| 29 | 571 | 1773.95 |
| 30 | 561 | 1804.13 |
| 31 | 552 | 1833.82 |
| 32 | 543 | 1863.04 |
| 33 | 534 | 1891.80 |
| 34 | 526 | 1920.13 |
| 35 | 519 | 1948.05 |
| 36 | 511 | 1975.58 |
| 37 | 504 | 2002.72 |
| 38 | 497 | 2029.51 |
| 39 | 491 | 2055.94 |
| 40 | 485 | 2082.04 |
| 41 | 479 | 2107.82 |
| 42 | 473 | 2133.28 |
| 43 | 467 | 2158.45 |
| 44 | 462 | 2183.32 |
| 45 | 457 | 2207.92 |
| 46 | 452 | 2232.24 |
| 47 | 447 | 2256.30 |
| 48 | 442 | 2280.11 |
| 49 | 437 | 2303.67 |
| 50 | 433 | 2326.99 |
| 51 | 429 | 2350.09 |
| 52 | 425 | 2372.95 |
| 53 | 420 | 2395.60 |
| 54 | 417 | 2418.04 |
| 55 | 413 | 2440.27 |

TABLE 1-continued

| Position (µsteps) | Time Between Steps (µs) | Velocity (µsteps/s) |
| --- | --- | --- |
| 56 | 409 | 2462.30 |
| 57 | 405 | 2484.13 |
| 58 | 402 | 2505.77 |
| 59 | 398 | 2527.23 |
| 60 | 395 | 2548.51 |
| 61 | 392 | 2569.61 |
| 62 | 389 | 2590.54 |
| 63 | 385 | 2611.30 |
| 64 | 382 | 2631.90 |
| 65 | 379 | 2652.34 |
| 66 | 376 | 2672.62 |
| 67 | 374 | 2692.75 |
| 68 | 371 | 2712.73 |
| 69 | 368 | 2732.56 |
| 70 | 366 | 2752.25 |
| 71 | 363 | 2771.81 |
| 72 | 360 | 2791.22 |
| 73 | 358 | 2810.50 |
| 74 | 355 | 2829.65 |
| 75 | 353 | 2848.67 |
| 76 | 351 | 2867.56 |
| 77 | 348 | 2886.33 |
| 78 | 346 | 2904.98 |
| 79 | 344 | 2923.51 |
| 80 | 342 | 2941.92 |
| 81 | 340 | 2960.22 |
| 82 | 338 | 2978.41 |
| 83 | 336 | 2996.48 |
| 84 | 334 | 3014.45 |
| 85 | 332 | 3032.31 |
| 86 | 330 | 3050.07 |
| 87 | 328 | 3067.72 |
| 88 | 326 | 3085.27 |
| 89 | 324 | 3102.73 |
| 90 | 322 | 3120.08 |
| 91 | 320 | 3137.34 |
| 92 | 319 | 3154.51 |
| 93 | 317 | 3171.58 |
| 94 | 315 | 3188.56 |
| 95 | 314 | 3205.45 |
| 96 | 312 | 3222.25 |
| 97 | 310 | 3238.97 |
| 98 | 309 | 3255.60 |
| 99 | 307 | 3272.14 |
| 100 | 306 | 3288.60 |
| 101 | 304 | 3304.98 |
| 102 | 303 | 3321.28 |
| 103 | 301 | 3337.50 |
| 104 | 300 | 3353.64 |
| 105 | 298 | 3369.70 |
| 106 | 297 | 3385.69 |
| 107 | 295 | 3401.60 |
| 108 | 294 | 3417.44 |
| 109 | 293 | 3433.21 |
| 110 | 291 | 3448.90 |
| 111 | 290 | 3464.52 |
| 112 | 289 | 3480.07 |
| 113 | 287 | 3495.55 |
| 114 | 286 | 3510.97 |
| 115 | 285 | 3526.32 |
| 116 | 284 | 3541.60 |
| 117 | 282 | 3556.81 |
| 118 | 281 | 3571.96 |
| 119 | 280 | 3587.05 |
| 120 | 279 | 3602.07 |
| 121 | 278 | 3617.03 |
| 122 | 277 | 3631.93 |
| 123 | 275 | 3646.77 |
| 124 | 274 | 3661.54 |
| 125 | 273 | 3676.26 |
| 126 | 272 | 3690.92 |
| 127 | 271 | 3705.52 |
| 128 | 270 | 3720.07 |
| 129 | 269 | 3734.56 |
| 130 | 268 | 3748.99 |
| 131 | 267 | 3763.36 |
| 132 | 266 | 3777.68 |
| 133 | 265 | 3791.95 |
| 134 | 264 | 3806.17 |
| 135 | 263 | 3820.33 |
| 136 | 262 | 3834.44 |
| 137 | 261 | 3848.49 |
| 138 | 260 | 3862.50 |
| 139 | 259 | 3876.45 |
| 140 | 258 | 3890.36 |
| 141 | 257 | 3904.22 |
| 142 | 256 | 3918.02 |
| 143 | 255 | 3931.78 |
| 144 | 255 | 3945.49 |
| 145 | 254 | 3959.15 |
| 146 | 253 | 3972.77 |
| 147 | 252 | 3986.34 |
| 148 | 251 | 3999.86 |
| 149 | 250 | 4013.34 |
| 150 | 249 | 4026.77 |
| 151 | 249 | 4040.16 |
| 152 | 248 | 4053.51 |
| 153 | 247 | 4066.81 |
| 154 | 246 | 4080.06 |
| 155 | 245 | 4093.28 |
| 156 | 245 | 4106.45 |
| 157 | 244 | 4119.58 |
| 158 | 243 | 4132.66 |
| 159 | 242 | 4145.71 |
| 160 | 241 | 4158.71 |
| 161 | 241 | 4171.68 |
| 162 | 240 | 4184.60 |
| 163 | 239 | 4197.49 |
| 164 | 238 | 4210.33 |
| 165 | 238 | 4223.14 |
| 166 | 237 | 4235.91 |
| 167 | 236 | 4248.64 |
| 168 | 236 | 4261.33 |
| 169 | 235 | 4273.98 |
| 170 | 234 | 4286.60 |
| 171 | 234 | 4299.17 |
| 172 | 233 | 4311.72 |
| 173 | 232 | 4324.22 |
| 174 | 232 | 4336.69 |
| 175 | 231 | 4349.13 |
| 176 | 230 | 4361.53 |
| 177 | 230 | 4373.89 |
| 178 | 229 | 4386.22 |
| 179 | 228 | 4398.51 |
| 180 | 228 | 4410.77 |
| 181 | 227 | 4423.00 |
| 182 | 226 | 4435.19 |
| 183 | 226 | 4447.35 |
| 184 | 225 | 4459.47 |
| 185 | 225 | 4471.57 |
| 186 | 224 | 4483.63 |
| 187 | 223 | 4495.65 |
| 188 | 223 | 4507.65 |
| 189 | 222 | 4519.61 |
| 190 | 222 | 4531.55 |
| 191 | 221 | 4543.45 |
| 192 | 220 | 4555.32 |
| 193 | 220 | 4567.15 |
| 194 | 219 | 4578.96 |
| 195 | 219 | 4590.74 |
| 196 | 218 | 4602.49 |
| 197 | 218 | 4614.21 |
| 198 | 217 | 4625.89 |
| 199 | 216 | 4637.55 |
| 200 | 216 | 4649.18 |
| 201 | 215 | 4660.78 |
| 202 | 215 | 4672.36 |
| 203 | 214 | 4683.90 |
| 204 | 214 | 4695.41 |
| 205 | 213 | 4706.90 |
| 206 | 213 | 4718.36 |
| 207 | 212 | 4729.79 |

TABLE 1-continued

| Position (µsteps) | Time Between Steps (µs) | Velocity (µsteps/s) |
|---|---|---|
| 208 | 212 | 4741.19 |
| 209 | 211 | 4752.57 |
| 210 | 211 | 4763.92 |
| 211 | 210 | 4775.24 |
| 212 | 210 | 4786.53 |
| 213 | 209 | 4797.80 |
| 214 | 209 | 4800.00 |

Table 1 includes at least one time value—e.g., 210 microseconds—that corresponding to given step—e.g., step 212—of the stepper motor for which the table was generated. This table also includes a time value for each step of the stepper motor. That is, this table also includes a time value associated with each step of the stepper motor for which the table was generated.

The values, or information, in Table 1 defines both an acceleration profile and a deceleration profile of the stepper motor for which it was generated. These profiles are substantially linear because the values, or information, in Table 1 achieves substantially the maximum constant acceleration (and deceleration) for all steps of the stepper motor for which it was generated. Any non-linearity of the profiles defined by Table 1 is due to quantization. If signals are sent to the coils of the stepper motor for which Table 1 was generated consistently with the values in Table 1, the acceleration and deceleration profiles defined by the values in Table 1 will characterize the movement of the pointer of the gauge to which that stepper motor is connected.

It is possible, consistent with the present invention, to generate an information set, such as a table, having values that achieve the maximum constant acceleration (and deceleration) for all steps of the stepper motor for which it was generated. Such an information set would be the smallest information set that defines linear acceleration and deceleration profiles, and thus would take up the smallest amount of memory when stored.

Using the methods and devices of the present invention, however, it is possible to direct the stepper motor for which Table 1 was generated to deviate from the acceleration and/or deceleration profiles defined by the values in Table 1. More specifically, such direction may be made and such deviation achieved without using, or referencing, other information sets or tables, as has previously been required. Further, such direction may be made and such deviation achieved after the deceleration or acceleration begins.

In one embodiment, such deviation may be achieved at least in part by determining whether to move the stepper motor more than one consecutive step for a particular time value, or interval, during acceleration or deceleration of the stepper motor (i.e., repeat a step at the same interval as the previous step). That is, such deviation may be achieved at least in part by determining whether to keep an interval for a consecutive step. In addition, that determination may be made as the acceleration or deceleration is occurring. Thus, the determining may occur on-the-fly.

For example, during acceleration of the stepper motor, instead of moving the stepper motor the eleventh microstep after waiting 940 microseconds after the tenth microstep as set forth in Table 1, one embodiment of the present invention includes determining whether to move the stepper motor an eleventh microstep at the same velocity it was moved to achieve the tenth microstep. This reference to velocity will be understood to be a reference to the velocity associated with a particular step of movement, averaged from the initial velocity associated with that step and the final velocity associated with that step. That is, in one embodiment of the present invention, a determination is made (using Table 1 as an example) during acceleration of whether to move the stepper motor an eleventh microstep at the same time value (i.e., 988 microseconds) associated with the tenth microstep, thereby deviating from the acceleration profile defined by Table 1. If such a decision is made, the stepper motor is directed to move such that it follows an acceleration profile that is different from the one defined by the values in Table 1.

Similarly, during deceleration of the stepper motor, instead of moving the stepper motor down to the 212th microstep from the 213th microstep after waiting 210 microseconds after that 213$^{th}$ microstep consistent with the values in Table 1, one embodiment of the present invention includes determining whether to move the stepper motor down to the 212th microstep from the 213th microstep at the same velocity (i.e., as "velocity" was described above) it was moved to achieve the 213th microstep. That is, in one embodiment of the present invention, a determination is made (using Table 1 as an example) during deceleration of whether to move the stepper motor down to the 212th microstep from the 213th microstep at the same time value (i.e., 209 microseconds) of, or associated with, the 213th microstep, thereby deviating from the deceleration profile defined by Table 1. If such a decision is made, the stepper motor is directed to move such that it follows a deceleration profile that is different from the one defined by Table 1.

The methods of the present invention are more advantageous than previous methods that only offered a single acceleration profile and a single deceleration profile for moving a stepper motor. In such cases, the controlling method or device might move the pointer in a jittery fashion because, for example, it cannot adjust to a change in the desired position once deceleration or acceleration begins. This jitter may also translate into sluggishness.

The methods of the present invention are also more advantageous than previous methods that only offered multiple acceleration profiles and deceleration profiles associated with different tables. Embodiments of the present invention make it possible to generate an information set that defines an acceleration profile for a stepper motor and a deceleration profile for the stepper motor. Such embodiments also make it possible to determine whether to direct the stepper motor to move more than one consecutive step at a particular time value (i.e., repeat the interval associated with a first step when taking a second, consecutive step) during acceleration or deceleration of the stepper motor. In addition, that determination may be made as the acceleration or deceleration is occurring. One term that may be used to describe the maintenance of the same velocity (i.e., as "velocity" was described above) at a consecutive step is "holdcount." That is, the term "holdcount" is used to describe the decision to maintain the velocity of a consecutive step.

A predetermined number of holdcounts may be associated with each step of the stepper motor, and those holdcounts may be utilized in whole or in part each time a determination is made of whether to move the stepper motor more than one consecutive step at the same time value associated with the previous step. Thus, embodiments of the present invention make it possible to direct a stepper motor to follow a new acceleration or deceleration profile once the motor has begun following an original, or default, acceleration or deceleration profile defined by the values in the information set. As a result, embodiments of the present methods make it possible to switch between profiles during deceleration as the final desired position changes. By contrast, the prior art that offered different information sets that defined corresponding different, pre-determined acceleration or deceleration profiles lacked the ability to direct a stepper motor to change profiles, once acceleration or deceleration began. In short, embodiments of the present methods afford more flexibility in the control of steppers motors, and thus improve control and accuracy without increased complexity.

FIG. 1 illustrates shortcomings of the single and multiple-table prior art, and further illustrates how an embodiment of the present invention addresses them. FIG. 1 is a graph of the velocity of a stepper motor versus the position, or step count, of the stepper motor. Arrows 160 represent the stepper motor's direction. FIG. 1 shows deceleration profile 175, which represents a deceleration profile defined by an information set (not shown). At position 165, a signal, or a command, is received, indicating that the stepper motor should be stopped at first final position 170. (It is, of course, possible that such a signal could have been received at some step prior to position 165.) The embodiment of the present methods represented in FIG. 1 then directs the stepper motor to follow deceleration profile 180, which is characterized by two holdcounts associated with each step of the stepper motor. At position 185, a signal is received to stop the stepper motor at second (i.e., a new) final position 190. As a result, the embodiment of the present methods represented in FIG. 1 directs the stepper motor to begin decelerating along deceleration profile 175. At position 198, the stepper motor is directed to move again along deceleration profile 180, given the number of steps remaining to second final position 190. As a result, deceleration profile 195 has been created. This ability to switch between profiles as deceleration (or, in another embodiment that is not illustrated, acceleration) occurs in response to changes in the desired position is not present in prior art methods. Described another way, embodiments of the present invention make it possible to create a deceleration profile different from the one defined by the information set after deceleration begins.

To understand shortcomings such as jitter/overshoot, sluggishness, and lack of flexibility, consider first the prior art that provided only a single table that defined one deceleration profile and one acceleration profile. Such a deceleration profile could be represented by deceleration profile 180 in FIG. 1. When a signal is received at position 165 to stop the stepper motor at first final position 170, the prior art method could direct the stepper motor to deceleration along deceleration profile 180. However, after deceleration had begun, had that prior art method received at position 185 a signal to stop the stepper motor at second (i.e., a new) final position 190, the stepper motor directed by the prior art method would have had to keep decelerating along profile 180 until it reached first final position 170. Then, as a result of direction from the prior art method, the motor would have back-stepped until it reached second final position 190. Thus, such prior art method would have overshot the second final position point 190, causing jitter, and it would have arrived at the second final position point 190 more slowly than the embodiment of the present invention, which could switch profiles on-the-fly. Hence, the sluggishness. Even prior art that offered two different tables that provided for two different deceleration profiles—such as deceleration profiles 175 and 180—suffered from such overshoot and sluggishness, because such prior art lacked the ability to switch profiles after deceleration had begun.

Each shortcoming that is associated with the prior art in terms of deceleration as described above, may also be associated with the prior art in terms of acceleration. Further, just as embodiments of the present methods provide the ability to direct a stepper motor to deviate from a deceleration profile during deceleration as detailed above, so too do embodiments of the present methods provide the ability to direct a stepper motor to deviate from an acceleration profile during acceleration. The principles of operation of the present invention in terms of directions that may be provided to a stepper motor during acceleration and during deceleration are the same.

The present invention is also useful where an information set already exists. For example, a microcontroller may have access to an information set that defines particular acceleration and deceleration profiles. Using embodiments of the present invention, it is possible to generate a new, modifiable information set that defines linear acceleration and deceleration profiles, and thus may be smaller in terms of the number of values in the information set than the original information set. (Such an information set may be created, or generated, using one or more of the existing stepper motor's operational features.) One or more holdcounts may then be associated with one or more of the steps in the new information set. More specifically, such holdcounts may be used consistent with the present invention such that if they are all followed, the resulting profile (be it acceleration or deceleration) is substantially similar to the original profile (be it acceleration or deceleration) defined by the original information set. By taking this approach, it is possible to access an existing information set, and generate (and store) a new information set that defines linear acceleration and deceleration profiles and that may be modified using hold-counts to define acceleration and deceleration profiles that are the same as or substantially the same as the profiles defined by the existing information set. This is an example of the flexibility that embodiments of the present invention may lend to existing controllers.

Figure 2:
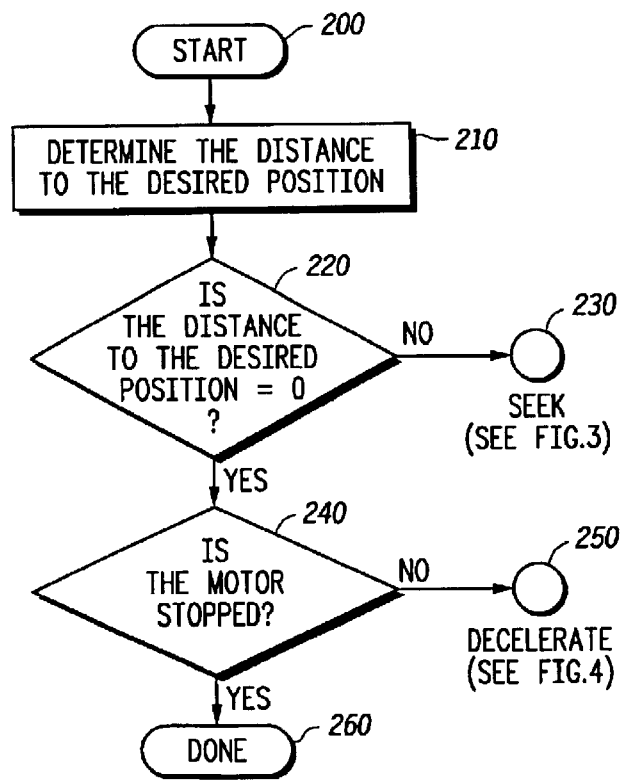
FIGS. 2–7 are flow charts that detail one embodiment of how aspects of the present invention are carried out prior to each step of a stepper motor.

An embodiment of aspects of the present invention that details the decisions made prior to each step of a stepper motor is illustrated in the flow charts of FIGS. 2–7. As shown in FIG. 2, the control to make a decision, referred to as simply the "control," starts at block 200. The "block" is used to describe the decision made at the different stages within the flow charts of FIGS. 2–7. However, those skilled in the art will understand that the process of making the decision at a given block may also be characterized as a "step" in a method (rather than a step of the stepper motor). At block 210, a determination of the distance to the desired position is made. In one embodiment, the result of such a determination is the identification or realization of the number of steps that the stepper motor must take to reach the desired position. At block 220, the distance to the desired position is compared to zero. If the distance is not zero, controls passes to SEEK block 230, the functions of which are shown in detail with reference to FIG. 3. If the distance is zero, control passes to block 240, at which a determination of whether the motor is stopped is made. If the motor is not stopped, control passes to DECELERATION block 250, the functions of which are shown in detail with reference to FIG. 4. If the motor is stopped, all decisions are complete for that step of the motor as indicated at 260.

Figure 3:
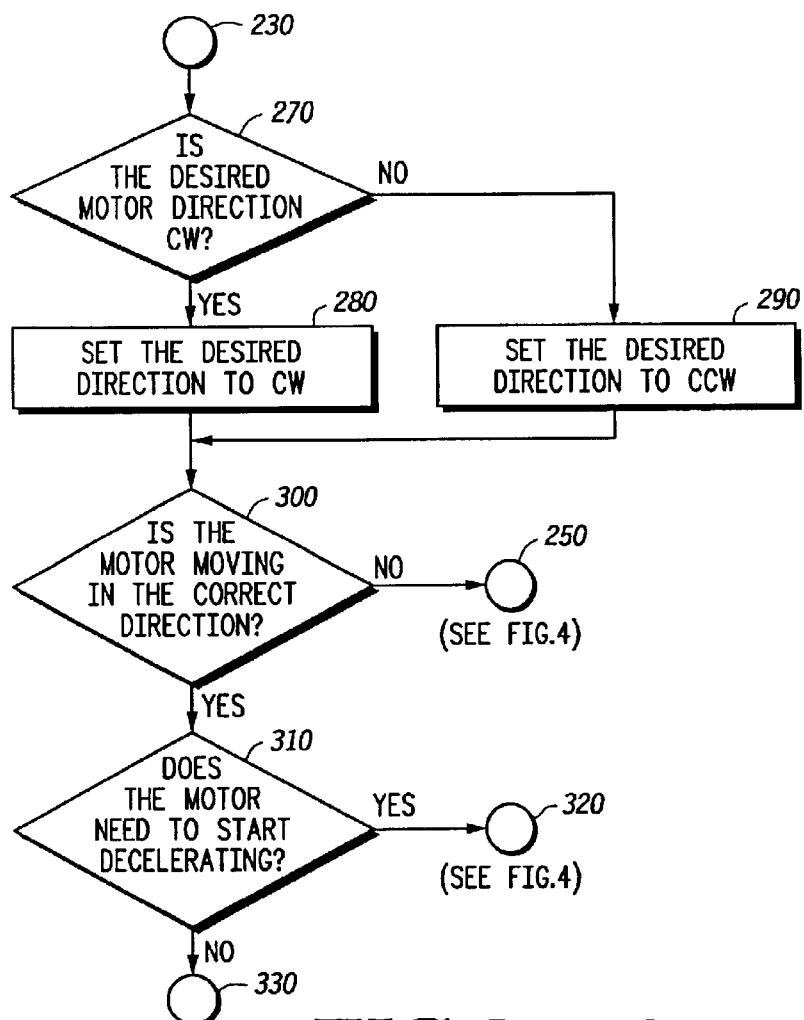

SEEK block 230 begins in FIG. 3. At block 270 in FIG. 3, a determination is made of whether the desired motor direction is clockwise. If not, control passes to block 290, which requires that the desired direction be set to counter clockwise. If so, control passes to block 280, which requires that the desired direction be set to clockwise. After the proper direction is set, control passes to block 300, which asks whether the motor is moving in the correct direction. If not, control passes to block 250. If so, control passes to block 310, which asks whether the motor needs to start decelerating. In an embodiment in which a predetermined number of holdcounts have been associated with each step in an information set, the decision at block 310 may be made by determining whether the distance at the next step is less than or equal to the distance needed to decelerate including the predetermined holdcounts. If so, the motor cannot accelerate and must start to decelerate. Therefore, if the determination is yes, control passes to block 320, the functions of which are shown in detail with reference to FIG. 4. If the determination is no, control passes to block 330, the functions of which are shown in detail with reference to FIG. 6.

Those of skill in the art will understand that any number of holdcounts may be associated with any of the steps that a stepper motor is capable of taking. For example, 1, 2, 3, 4, 5, 6, 7, 8, 9, 10, or more holdcounts may be associated with one, more than one but less than all, or all of the steps that a stepper motor may take, consistent with the present invention. Furthermore, multiple sets of holdcounts may also be associated with any of the steps that a stepper motor is capable of taking. As a result, one, more than one but less than all, or all of the steps that a stepper motor is capable of taking may have associated with them 2, 3, 4, 5, 6, 7, 8, 9, 10 or more sets of holdcounts. The possibilities are unlimited, and will be dictated by system parameters.

Figure 4:
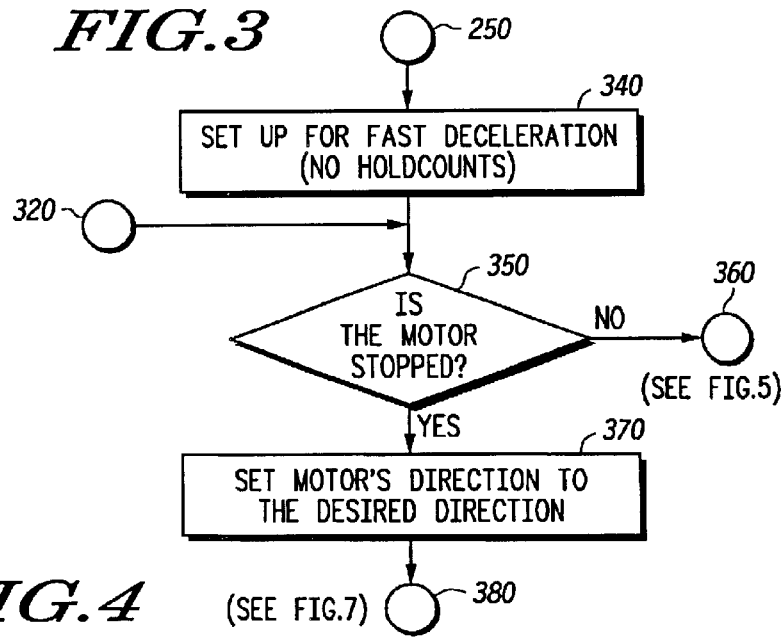

FIG. 4 begins at block 250. At block 340, the method sets up for fast deceleration, which involves no holdcounts. Block 320 meets the decision tree at this point, and block 350 next asks whether the motor is stopped. If not, control passes to block 360, the functions of which are shown in detail with reference to FIG. 5. If so, control passes to block 370, which directs that the motor's direction be set to the desired direction. Then, the flow chart directs that control pass to block 380, the functions of which are shown in detail with reference to FIG. 7.

Figure 5:
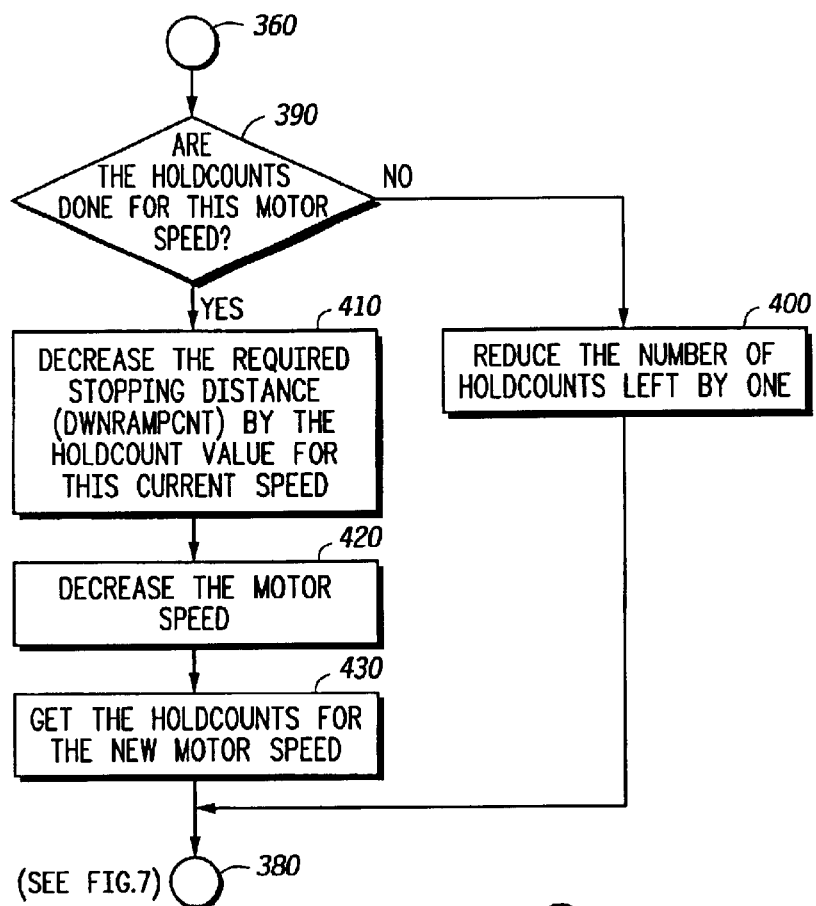

FIG. 5 begins at block 360. Next, block 390 requires a determination of whether the holdcounts have been completed at that velocity. If not, control passes to block 400, which directs that the number of holdcounts remaining be reduced by one. Afterwards, control passes to block 380. If so, control passes to block 410, which directs that the required stopping distance (represented by DWNRAMPCNT, or down rampcount) be reduced by the holdcount value for the current speed. At block 420, the motor speed is decreased. At block 430, the holdcount value for the new motor speed is obtained. Control next passes to block 380.

Figure 6:
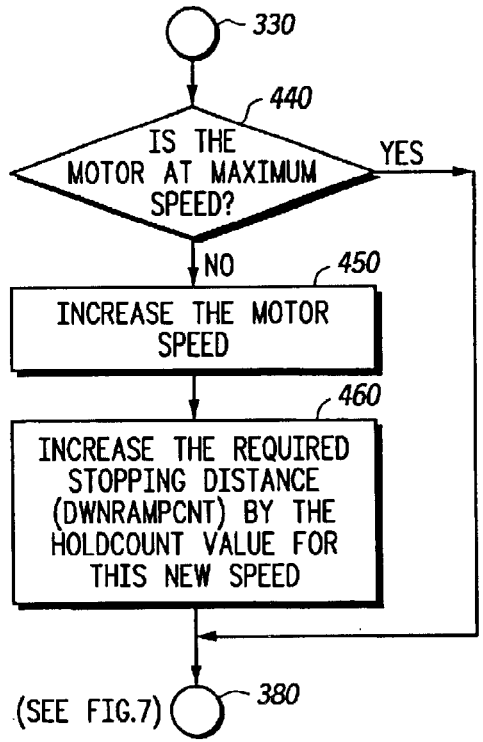

FIG. 6 begins with block 330. At block 440, a determination is made of whether the motor is at its maximum speed. If so, control passes to block 380. If not, the motor speed is increased at block 450. Next, the required stopping distance (DWNRAMPCNT) is increased by the holdcount value for the new speed. Control passes to block 380 next.

Figure 7:
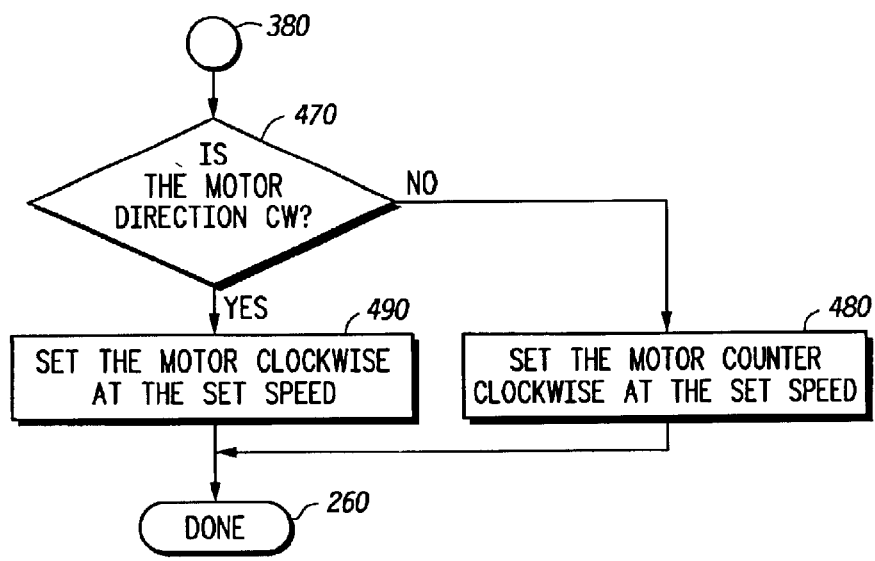

FIG. 7 begins with block 380. At block 470, a determination is made of whether the motor direction is clockwise. If not, control passes to block 480, where the motor is stepped counter clockwise at the set speed. If so, control passes to block 490, where the motor is stepped clockwise at the set speed. After both blocks 480 and 490, the decisions for that step of the stepper motor are complete, as indicated at 260.

Figure 8:
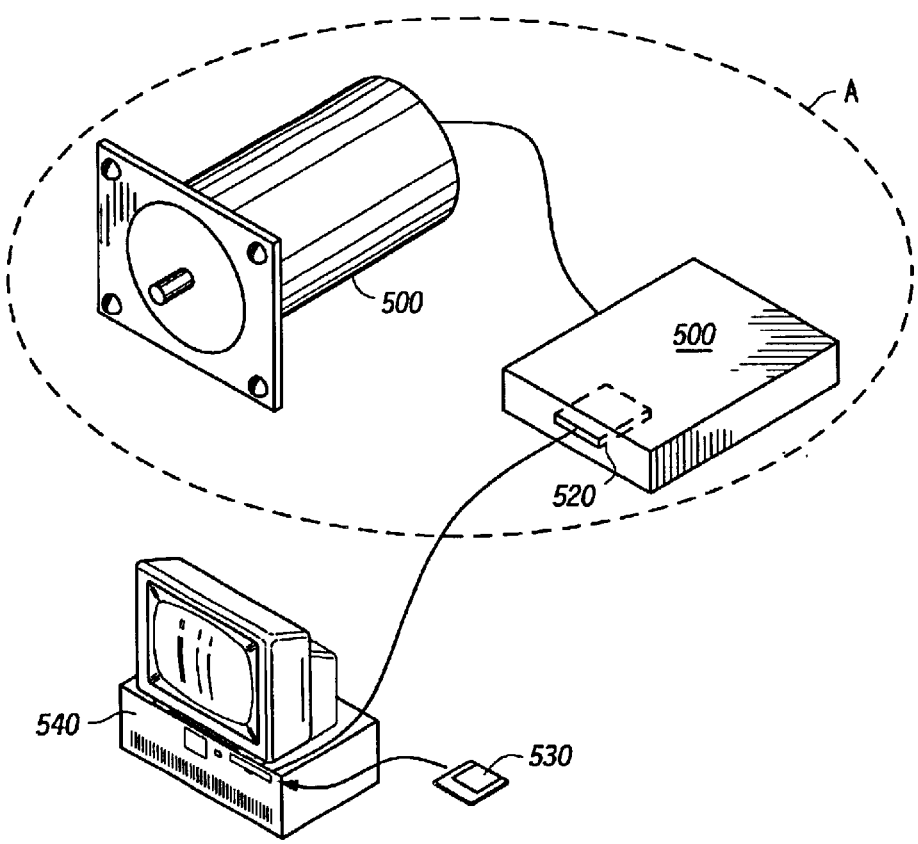
FIG. 8 is a block diagram of a rotational stepper motor driven by a microcontroller, and depicts various circuits that may be used to carry out steps from methods of the present invention.

The steps of the present methods can be embodied in computer-readable, or computer-usable, media having instructions or software for carrying out the steps. Such software or computer instructions may be loaded onto a microcontroller that interfaces with a given stepper motor in order to control its movement. Section A of FIG. 8 depicts an example of the connection between a rotational stepper motor 500 and microcontroller 510. The line connecting rotational stepper motor 500 and microcontroller 510 is intended to convey that a connection between the two exists, and is not to be considered an accurate representation of a physical connection between the two.

Software or computer instructions configured to carry out one or more steps of the methods of the present invention may be loaded onto a circuit, such as an integrated circuit, that is connected to a microcontroller that controls a given stepper motor. The connection between the integrated circuit and the microcontroller may take place through a serial peripheral interface. FIG. 8 depicts this in block form. That is, FIG. 8 is a block diagram showing block 520, which is connected to microcontroller 510. One example of block 520 is an integrated circuit, which may take the form of an application specific integrated circuit. Further, FIG. 8 also shows machine 540, which may be a computer as shown, coupled to block 520 for loading the machine-, or computer-, readable instructions stored on computer readable medium 530 onto block 520. Those of skill in the art will understand that computer readable medium 530 may take many forms, including any data storage device that can store data that can thereafter be read by a computer or a computer system, including a disk, such as a floppy disk, a zip disk, or the like; read-only memory; random access memory; CD-ROMs; magnetic tape; optical data storage devices, SMARTMEDIA® cards; flash memory compact flash memory; and the like. The computer readable medium can also be distributed over network-coupled computer systems so that the computer readable instructions are stored and executed in a distributed fashion. For example, the computer readable medium may also take the form of a carrier wave such as, for example, signals on a wire (e.g., signals downloaded from the Internet) or those that are transmitted electromagnetically or through infra red means.

Other examples of block 520 are also within the scope of the devices of the present invention. Specifically, in one embodiment, block 520 is a state machine or machines onto/into which the instructions from medium 530 may be loaded/burned using, for example, computer 540. An example of the functions that may be performed by such a state machine or machines consistent with the present invention is given in the flow charts of FIGS. 2–7. In such a case, microcontroller 510 is directed by the logic, such as digital logic, burned into the state machine(s) that comprise block 520. In another embodiment, block 520 may be a dedicated memory device—such as flash memory, compact flash memory, RAM, magnetic RAM (MRAM), static RAM (SRAM), dynamic RAM (DRAM), erasable programmable ROM (EPROM), electronically erasable programmable ROM (EEPROM)—of microcontroller 510 onto which the instructions from medium 530 may be loaded using, for example, computer 540. In another embodiment, block 520 may be a programmable gate array—such as a field programmable gate array—onto which the instructions from medium 530 may be loaded using, for example, computer 540.

The present invention may take the form of a controller for a stepper motor that includes a circuit configured to perform one or more of the steps detailed above. Examples of these circuits appear in FIG. 8. For example, one such circuit comprises a microcontroller, such as microcontroller 510, to which an integrated circuit, such as one represented by block 520, is connected. In such a circuit, the integrated circuit may comprise software, or computer readable instructions, from a computer readable medium, such as medium 530, loaded onto or burned into the integrated circuit. Another such circuit is simply the integrated circuit and, more specifically, the integrated circuit onto which software, or computer readable instructions, from a computer readable medium, such as medium 530, are loaded or burned. Another such circuit comprises a microcontroller, such as microcontroller 510, to which a state machine or machines, such as those represented by block 520, is connected. In such a circuit, the state machine or machines may comprise software, or computer readable instructions, from a computer readable medium, such as medium 530, burned into the state machine or machines as logic, such as digital logic. Another such circuit is simply the state machine or machines and, more specifically, the state machine or machines hard coded with logic, such as digital logic, the logic comprising computer readable instructions from a computer readable medium, such as medium 530. Another such circuit simply comprises a microcontroller, such as microcontroller 510, loaded with computer readable instructions from a computer usable medium, such as medium 530.

Other suitable examples of circuits that may be used to carry out steps of the methods of the present inventions are possible, but need not be described in further detail for one of skill in the art to understand the different ways in which the present methods may be successfully implemented.

The following example is included to demonstrate a specific embodiment of aspects of the present invention. It should be appreciated by those of skill in the art that the techniques disclosed in the example that follows represent techniques discovered by the inventors to function well in the practice of these methods, and thus can be considered to constitute a specific mode for their practice. However, those of skill in the art should, in light of this disclosure, appreciate that many changes can be made in the specific embodiment that is disclosed, and still obtain a like or similar result without departing from the scope of the present methods.

EXAMPLE 1

Shown below is assembly code that is suitable for carrying out steps described above, and which may be used in conjunction with microcontrollers from Motorola, Inc.'s HC12 family of microcontrollers. The code beginning at "oc0_int:" and ending prior to the break marked by ";--------------------------" is an example of how to send data to a stepper motor, or how to direct a stepper motor. The remaining code is an example of how to carry out the steps set forth in the flow charts of FIGS. 2–7. This code is exemplary and does not limit the scope of the claims. It simply represents one specific embodiment for carrying out steps associated with the present methods and is included for the convenience of the reader in this regard. Those of skill in the art having the benefit of this disclosure will recognize that a wide variety of computational techniques and/or different types of corresponding source code may be used in implementing the present methods.

©2002 Motorola, Inc.

```
;****************************************************************
;
oc0_int:
; This interrupt routine implements the stepper
; motor algorithm and the setting up of the
; micro stepping for motor 1
oc0_int:
        bset    prtt,#$20       ;use prt5 as a timing marker
; step_motor the motor
sincoil_1:
        ldx     #sinval_12      ; x is pointer to sin table
        ldd     step_1
        bclr    prtb,$03        ; PB1:PB0=0:0 (select sin coil of motor_1)
        ldaa    D,x
        staa    prta            ; write sin data to coil of motor_1
        ldx     #sin_dir_12
        ldd     step_1
    ldaa    D,x                 ; get direction information
        beq     pos_sin_1
        bset    prtb,$04        ; PB2 = 1 is negative sin current
        bra     cont_s_1
pos_sin_1:
        bclr    prtb,$04        ; PB2 = 0 is positive sin current
cont_s_1:
        jsr     delay_10us      ; delay 10us
    jsr     delay_10us
        bclr    prtp,$01        ; strobe the WR1 signal
    ; jsr    delay_2us
        bset    prtp,$01        ; this is 4 clocks = 500ns @ 8MHz
coscoil_1:
        ldx     #cosval_12      ; x is pointer to sin table
        ldd     step_1
        bclr    prtb,$02        ; PB1 = 0 (select cos coil of motor_1)
        bset    prtb,$01        ; PB0 = 1
        ldaa    D,x
        staa    prta            ; write cos data to coil of motor_1
        ldx     #cos_dir_12
        ldd     step_1
    ldaa    D,x                 ; get direction information
        beq     pos_cos_1
        bset    prtb,$08        ; PB3 = 1 is negative sin current
```

```
                bra     cont_c_1
pos_cos_1:
        bclr    prtb,$08        ; PB3 = 0 is positive sin current
cont_c_1:
        jsr     delay_10us      ; delay 10us
        jsr     delay_10us
        bclr    prtp,$01        ; strobe the WR1 signal
        ; jsr   delay_2us
        bset    prtp,$01        ; this is 4 clocks = 500ns @ 8MHz
;---------------------------
calculate_next_step_1:
        ldd     desired_pos_1
        subd    current_pos_1
        bne     seek_1          ; If desired_pos <> current_pos then seek
;desired_pos = current_pos, so check if rampcnt = 0.
        ldd     rampcnt_1
        lbeq    exit_oc0        ; If rampcnt = 0 then hold position
        lbra    fast_down_1     ; else, slow motor down and continue stepping
;desired_pos <> current_pos, so check which direction
seek_1: blo     ccw_1
cw_1:   std     distance_1      ; store CW distance
        ldaa    #$00
        staa    desired_dir_1   ; desired dir = CW = 0
        bra     chk_direction_1
ccw_1:  ldd     current_pos_1   ; distance is negative so calculate
        subd    desired_pos_1   ;   positive distance
        std     distance_1      ; store CCW distance
        ldaa    #$ff
        staa    desired_dir_1   ; desired_dir = CCW = $ff
; check if current direction is same as desired direction
chk_direction_1:
        cmpa    current_dir_1
        bne     fast_down_1     ; if current_dir <> desired_dir slow down motor
; current direction = desired direction so check distance
; Check if distance - 1 <= dwnrampcnt + holdcnt[rampcnt+1] + 1
; The addition + 1 at the end of the formula is to accomodate for
; the holdcnt values actually being N-1
;
; The above relationship can also be written as:
; !!! dwnrampcnt + holdcnt[rampcnt+1] +2 > distance !!!
chk_distance_1:
        ldx     #hold_buf_1
        ldd     rampcnt_1
        addd    #1              ; D = rampcnt + 1
        ldab    D,x             ; B = holdcnt[rampcnt+1]
        clra
        addd    dwnrampcnt_1    ; D = dwnrampcnt + holdcnt[rampcnt+1]
        addd    #2              ; D = dwnrampcnt + holdcnt[rampcnt+1] + 2
        cpd     distance_1
        bhi     down_ramp_1     ; if dwnrampcnt + holdcnt[rampcnt+1] + 2 > distance
                                ; then slow down motor (down_ramp)
; distance is > dwnrampcnt + holdcnt[rampcnt+1] + 1 so check speed of motor
chk_speed_1:
        ldx     #hold_buf_1
        ldd     rampcnt_1
        ldab    D,x
        clra
        std     count_1         ; count = holdcnt[rampcnt]
        ldd     rampcnt_1
        cpd     desired_vel_1
        beq     step_motor_1    ; if speed is max, then maintain speed
increase_speed_1:
        ldx     #hold_buf_1
        addd    1 #1            ; increase speed (rampcnt = rampcnt + 1)
        std     rampcnt_1
        ldab    D,x             ; D = holdcnt[rampcnt]
        clra
        std     count_1         ; count = holdcnt[rampcnt]
        addd    #1
        addd    dwnrampcnt_1
        std     dwnrampcnt_1    ; dwnrampcnt = dwnrampcnt + holdcnt[rampcnt]+1
        bra     step_motor_1
; motor needs to be slowed down so walk down velocity table (i.e., take default
; profile defined by information set)
fast_down_1:
        ldd     #0
        std     count_1
; motor needs to be slowed down so walk down velocity table (i.e., take default
; profile defined by information set)
```

-continued

```
down_ramp_1:
        ldd rampcnt_1              ; if rampcnt = 0,
        beq update_direction_1 ;                  update motor direction
chk_dec_counter_1:
        ldd count_1                ; is count = 0
        beq decrease_speed_1
        subd #1                    count <> 0 so
        std count_1                ;   count = count − 1
        bra step_motor_1
decrease_speed_1:
        ldx #hold_buf_1
        ldd rampcnt_1
        ldab D,x                   ; D = holdcnt[rampcnt]
        clra
        addd #1                    ; D = holdcnt[rampcnt] + 1
        std L_temp
        ldd dwnrampcnt_1
        subd L_temp                ; D = dwnrampcnt − (holdcnt[rampcnt]+1)
;; new code
        bhs ok1_1                   ; check to make sure dwnrampcnt doesn't go below 0
        ldd #0                     ; if so, make it 0
ok1_1: std dwnrampcnt_1            ; dwnrampcnt = dwnrampcnt − (holdcnt[rampcnt]+1)
;; new code
        ldd rampcnt_1
        subd #1
;; new code
        bhs ok2_1
        ldd #0
ok2_1: std rampcnt_1               ; rampcnt = rampcnt − 1
;; new code
        ldab D,x
        clra
        std count_1                ; count = holdcnt[rampcnt]
        bra step_motor_1
update_direction_1:
        ldaa desired_dir_1
        staa current_dir_1
step_motor_1:
tst current_dir_1                  ; check motor direction
bne step_ccw_1
step_cw_1:
        ldx     step_1             ; get current step
        cpx     #usteps_1 − 1      ; check if last step (value goes from 0 − ustep-1)
        bne     inc_cw_1
        ldx     #$ffff             ; if last step set next step to first step
inc_cw_1:
        inx
        stx     step_1             ; update motor step
        ldx     current_pos_1
        inx                        ; update current motor position
        stx     current_pos_1
        bra exit_oc0
step_ccw_1:
        ldx     step_1             ; get current step
        bne     dec_ccw_1          ; check if last step (value goes from 0 − usteps-1)
        ldx     #usteps_1          ; number of steps in full wave
dec_ccw 1:
        dex
        stx     step_1             ; update motor step
        ldx     current_pos_1
        dex                        ; update current motor position
        stx     current_pos_1
exit_oc0:
        ldx     ramp_ptr_1         ; get ramp table
        ldd     rampcnt_1
        lsld                       ; The ramp table consists of word data so multiply
                                   ; rampcnt by 2
        ldd     D,x
        addd    TC0
        std     TC0
        bclr    prtt,$20           ; prt5 is used as a timing marker
        rti                        ; exit, wait for next step
;************************************************************
;
```

The individual components described above need not be made in the exact disclosed forms, or combined in the exact disclosed configurations, but could be provided in any suitable form, and/or combined in any suitable configuration. It will also be clear that other various substitutions, modifications, additions and/or rearrangements of the features of the inventive methods and devices may be made without deviating from their scope, which is defined by the claims and their equivalents. The claims are not to be interpreted as including means-plus-function limitations, unless such a limitation is explicitly recited in a given claim using the phrase(s) "means for" and/or "step for."

We claim:

1. A method for controlling a stepper motor, comprising:
   creating an information set that defines a first acceleration profile of a stepper motor and a first deceleration profile of the stepper motor, the information set including an interval associated with each step of the stepper motor;
   determining, after the stepper motor begins but before the stepper motor completes either the first acceleration profile or the first deceleration profile, whether to move the stepper motor more than one consecutive step for an associated interval; and
   directing the stepper motor such that the stepper motor follows either a second acceleration profile or a second deceleration profile, the following occurring after the stepper motor begins, but before the stepper completes, either the first acceleration profile or the first deceleration profile.

2. The method of claim 1, where the information set is created based on one or more operational features of the stepper motor, which operational features include a maximum velocity, a maximum acceleration, and a step value.

3. The method of claim 2, where a maximum constant acceleration for each step is defined in the information set.

4. The method of claim 1, further comprising:
   receiving a signal to move the stepper motor to a first final position, the directing comprising directing the stepper motor such that the stepper motor decelerates to the first final position by following a second deceleration profile, the following the second deceleration profile occurring after the stepper motor begins, but before the stepper motor completes, the first deceleration profile.

5. The method of claim 4, further comprising:
   receiving a signal to move the stepper motor to a second final position during the deceleration, the directing comprising directing the stepper motor such that the stepper motor decelerates to the second final position by following a third deceleration profile, the following the third deceleration profile occurring after the stepper motor begins, but before the stepper motor completes, the second deceleration profile.

6. The method of claim 1, further comprising:
   moving the stepper motor more than one consecutive step for an identical interval to create a second deceleration profile that is not symmetrical to the first acceleration profile.

7. A computer readable medium comprising machine readable instructions for:
   creating an information set that defines a first acceleration profile of a stepper motor and a first deceleration profile of the stepper motor, the information set including an interval associated with each step of the stepper motor;
   determining, after the stepper motor begins but before the stepper motor completes either the first acceleration profile or the first deceleration profile, whether to move the stepper motor more than one consecutive step for an associated interval; and
   directing the stepper motor such that the stepper motor follows either a second acceleration profile or a second deceleration profile, the following occurring after the stepper motor begins, but before the stepper motor completes, either the first acceleration profile or the first deceleration profile.

8. The medium of claim 7, where the information set is created based on one or more operational features of the stepper motor, which operational features include a maximum velocity, a maximum acceleration, and a step value.

9. The medium of claim 8, where a maximum constant acceleration for each step is defined in the information set.

10. The medium of claim 7, further comprising machine readable instructions for:
    receiving a signal to move the stepper motor to a first final position, the directing comprising directing the stepper motor such that the stepper motor decelerates to the first final position by following a second deceleration profile, the following the second deceleration profile occurring after the stepper motor begins, but before the stepper motor completes, the first deceleration profile.

11. The medium of claim 10, further comprising machine readable instructions for:
    receiving a signal to move the stepper motor to a second final position during the deceleration, the directing comprising directing the stepper motor such that stepper motor decelerates to the second final position by following a third deceleration profile, the following the third deceleration profile occurring after the stepper motor begins to follow, but before the stepper motor completes, the second deceleration profile.

12. The medium of claim 7, further comprising machine readable instructions for:
    moving the stepper motor more than one consecutive step for an identical interval to create a second deceleration profile that is not symmetrical to the first acceleration profile.

13. A stepper motor controller comprising:
    a circuit configured to:
       store an information set that defines a first acceleration profile of a stepper motor and a first deceleration profile of the stepper motor, the information set including an interval associated with each step of the stepper motor;
       determine, after the stepper motor beams but before the stepper motor completes either the first acceleration profile or the first deceleration profile, whether to move the stepper motor more than one consecutive step for an associated interval; and
       direct the stepper motor such that the stepper motor follows either a second acceleration profile or a second deceleration profile, the following occurring after the stepper motor begins, but before the stepper motor completes, either the first acceleration profile or the first deceleration profile.

14. The controller of claim 13, where the information set is based on one or more operational features of the stepper motor, which operational features include a maximum velocity, a maximum acceleration, and a step value.

15. The controller of claim 14, where the maximum constant acceleration for each step is defined in the information set.

16. The controller of claim 13, where the circuit is further configured to:

receive a signal to move the stepper motor to a first final position, and direct the stepper motor such that the stepper motor decelerates to the first final position by following a second deceleration profile, the following the second deceleration profile occurring after the stepper motor begins, but before the stepper motor completes, the first deceleration profile.

17. The controller of claim 13, where the circuit is further configured to:

receive a signal to move the stepper motor to a second final position during the deceleration, and direct the stepper motor such that the stepper motor decelerates to the second final position by following a third deceleration profile, the following the third deceleration profile occurring after the stepper motor begins, but before the stepper motor completes, the second deceleration profile.

18. The controller of claim 13, where the circuit includes a state machine.

19. The controller of claim 13, where the circuit includes a microcontroller.

20. A method for controller a stepper motor, comprising:

accessing an existing information set in a microcontroller for a stepper motor, the existing information set defining a first acceleration profile of the stepper motor and a first deceleration profile of the stepper motor;

creating a new information set that defines a second acceleration profile of the stepper motor and a second deceleration profile of the stepper motor, and creating a third profile, using the new information set and one or more holdcounts, that is substantially the same as either the first acceleration profile or the first deceleration profile.

21. A method for controlling a stepper motor, comprising:

directing the stepper motor such that the stepper motor follows an acceleration profile, the following occurring after the stepper motor begins, but before the stepper motor completes, an earlier acceleration profile or an earlier deceleration profile.

22. A computer readable medium comprising machine readable instructions for:

directing a stepper motor such that the stepper motor follows an acceleration profile, the following occurring after the stepper motor begins, but before the stepper motor completes, an earlier acceleration profile or an earlier deceleration profile.

23. A stepper motor controller comprising:

a circuit configured to:

direct a stepper motor such that the stepper motor follows an acceleration profile, the following occurring after the stepper motor begins, but before the stepper motor completes, an earlier acceleration or deceleration profile.

24. A method for controlling a stepper motor, comprising:

directing the stepper motor such that the stepper motor follows an acceleration or deceleration profile, the following occurring after the stepper motor begins, but before the stepper motor completes, an earlier acceleration profile or an earlier deceleration profile;

where the second acceleration profile and the second deceleration profile are capable of being non-linear.

25. A computer readable medium comprising machine readable instructions for:

directing the stepper motor such that the stepper motor follows an acceleration or deceleration profile, the following occurring after the stepper motor begins, but before the stepper motor completes, an earlier acceleration profile or an earlier deceleration profile;

where the second acceleration profile and the second deceleration profile are capable of being non-linear.

26. A stepper motor controller comprising:

a circuit configured to:

direct a stepper motor such that the stepper motor follows an acceleration or deceleration profile, the following occurring after the stepper motor begins, but before the stepper motor completes, an earlier acceleration or deceleration profile;

where the second acceleration profile and the second deceleration profile are capable of being non-linear.

* * * * *